US012808239B2

(12) United States Patent
Pancholi et al.

(10) Patent No.: US 12,808,239 B2
(45) Date of Patent: Nov. 24, 2026

(54) DOOR ASSEMBLY

(71) Applicant: Tesla, Inc., Austin, TX (US)

(72) Inventors: Rajeevkumar P. Pancholi, Fremont, CA (US); Alexandre Laloum, Mountain View, CA (US); Houman Javadzadeh, San Leandro, CA (US)

(73) Assignee: Tesla, Inc., Austin, TX (US)

( * ) Notice: Subject to any disclaimer, the term of this patent is extended or adjusted under 35 U.S.C. 154(b) by 28 days.

(21) Appl. No.: 18/631,637

(22) Filed: Apr. 10, 2024

(65) Prior Publication Data

US 2025/0320757 A1 Oct. 16, 2025

(51) Int. Cl.

| | |
|---|---|
| ***E05B 85/10*** | (2014.01) |
| ***B60Q 1/26*** | (2006.01) |
| ***B60Q 1/32*** | (2006.01) |
| ***E05F 1/12*** | (2006.01) |
| ***E05F 3/20*** | (2006.01) |

(52) U.S. Cl.

CPC .......... *E05B 85/103* (2013.01); *B60Q 1/2669* (2013.01); *B60Q 1/323* (2013.01); *E05F 1/12* (2013.01); *E05F 3/20* (2013.01); *E05Y 2900/53* (2013.01)

(58) Field of Classification Search

CPC ....... E05B 85/10; E05B 85/103; E05B 85/107

See application file for complete search history.

(56) References Cited

U.S. PATENT DOCUMENTS 3,153,552 A * 10/1964 Sandor .................... E05B 85/14 292/DIG. 31
4,580,821 A * 4/1986 Genord, Jr .............. E05B 85/14 292/DIG. 31

(Continued)

FOREIGN PATENT DOCUMENTS

DE 3444898 C * 3/1986
DE 19847212 A1 * 4/2000 ............. E05B 85/14

(Continued)

OTHER PUBLICATIONS

"2020 McLaren GT Doors #shorts (youtube.com)", [Online]. Retrieved from the Internet: URL: https: www.youtube.com shorts 6ABr89C_2Z4, (accessed on Jun. 13, 2024), 1 pg.

(Continued)

*Primary Examiner* — Carlos Lugo
(74) *Attorney, Agent, or Firm* — Schwegman Lundberg & Woessner, P.A.

(57) ABSTRACT

A door assembly includes a door, and the door includes a first latch component configured to couple with a second latch component mounted to a jamb with a cavity. The door assembly includes a push panel coupled to the jamb, and the push panel covers at least a portion of the cavity in the jamb. The push panel is mounted adjacent to an edge of the door when the door is closed against the jamb, and the push panel is configured to release the first latch component of the door from the second latch component mounted to the jamb, in response to the push panel being pressed into the cavity in the jamb. The door is configured to be opened by a force pulling on the edge adjacent to the push panel, after the first latch component of the door has been released from the second latch component.

20 Claims, 6 Drawing Sheets

(56) References Cited

U.S. PATENT DOCUMENTS

| | | | | | |
|---|---|---|---|---|---|
| 4,867,501 | A * | 9/1989 | Nomura | E05B 85/10 | 292/336.3 |
| 4,895,403 | A * | 1/1990 | Osenkowski | E05B 85/107 | 292/DIG. 31 |
| 4,956,943 | A * | 9/1990 | Yamada | E05B 85/16 | 49/502 |
| 5,611,613 | A * | 3/1997 | Bergen | E05B 17/10 | 362/555 |
| 6,264,257 | B1 * | 7/2001 | Meinke | E05B 79/20 | 292/336.3 |
| 7,637,631 | B2 * | 12/2009 | McDermott | B60R 25/00 | 362/802 |
| 9,227,558 | B2 * | 1/2016 | Spence | E05B 81/76 | |
| 9,957,737 | B2 * | 5/2018 | Patel | E05B 85/10 | |
| 10,378,254 | B1 * | 8/2019 | Salter | E05B 81/76 | |
| 10,794,096 | B2 * | 10/2020 | Hamacher | E05B 5/006 | |
| 2008/0290685 | A1 | 11/2008 | Ohnuki | | |
| 2015/0123408 | A1 | 5/2015 | Longo | | |
| 2016/0251880 | A1 * | 9/2016 | Bingle | E05B 81/76 | 701/49 |
| 2019/0277071 | A1 | 9/2019 | Sabatini et al. | | |
| 2023/0258030 | A1 * | 8/2023 | Herman | B60R 25/23 | 292/336.3 |
| 2024/0240505 | A1 * | 7/2024 | Heilmann | B60J 10/86 | |
| 2024/0418018 | A1 * | 12/2024 | Zhou | E05B 85/18 | |
| 2025/0163734 | A1 * | 5/2025 | Calor | E05B 85/107 | |

FOREIGN PATENT DOCUMENTS

| | | | | |
|---|---|---|---|---|
| DE | 10309821 | A1 * | 9/2004 | E05B 77/02 |
| DE | 102019131339 | A1 * | 5/2021 | E05B 87/76 |
| DE | 102023121335 | A1 * | 2/2025 | E05B 85/103 |
| EM | 015075396-0001 | | 10/2024 | |
| EM | 015075396-0002 | | 10/2024 | |
| EP | 0380376 | A1 * | 8/1990 | E05B 85/14 |
| EP | 1985784 | A1 * | 10/2008 | E05B 85/107 |
| FR | 3096713 | A1 * | 12/2020 | E05B 85/10 |
| GB | 6395992 | | 10/2024 | |
| GB | 6395993 | | 10/2024 | |
| JP | 2019027076 | A * | 2/2019 | |
| WO | WO-2013111615 | A1 * | 8/2013 | E05B 81/78 |
| WO | 2024002624 | | 1/2024 | |

OTHER PUBLICATIONS

"European Application Serial No. 25168925.3, Extended European Search Report mailed Sep. 1, 2025", 10 pgs.

European Application Serial No. 25168925.3, Response filed Feb. 25, 2026 to Extended European Search Report mailed Sep. 1, 2025, 23 pgs.

* cited by examiner

OPERATION: PUSH PANEL CLOSED, DOOR LATCHED

OPERATION: PUSH PANEL OPENED, DOOR UNLATCHED BUT CLOSED

DOOR ASSEMBLY

TECHNICAL FIELD

The subject matter disclosed herein generally relates to the technical field of doors, including vehicle doors. Specifically, the present disclosure addresses a door assembly.

BACKGROUND

Doors commonly have handles mounted on, embedded in, or otherwise affixed to the doors themselves, such that a handle on the door is operable to unlatch the door and then swing affixed to the door as the door opens. On vehicles (e.g., a car, a pickup truck, an airplane, or a boat), a typical door and its handle are designed and configured to utilize a same single pulling motion of a human hand to both unlatch the door, such as by pulling on the handle toward the direction in which the door opens, and then pull the door open by continuing to pull on the handle in the same direction in which the door opens.

BRIEF DESCRIPTION OF THE DRAWINGS

Some embodiments are illustrated by way of example and not limitation in the figures of the accompanying drawings.

DETAILED DESCRIPTION

Figure 1:
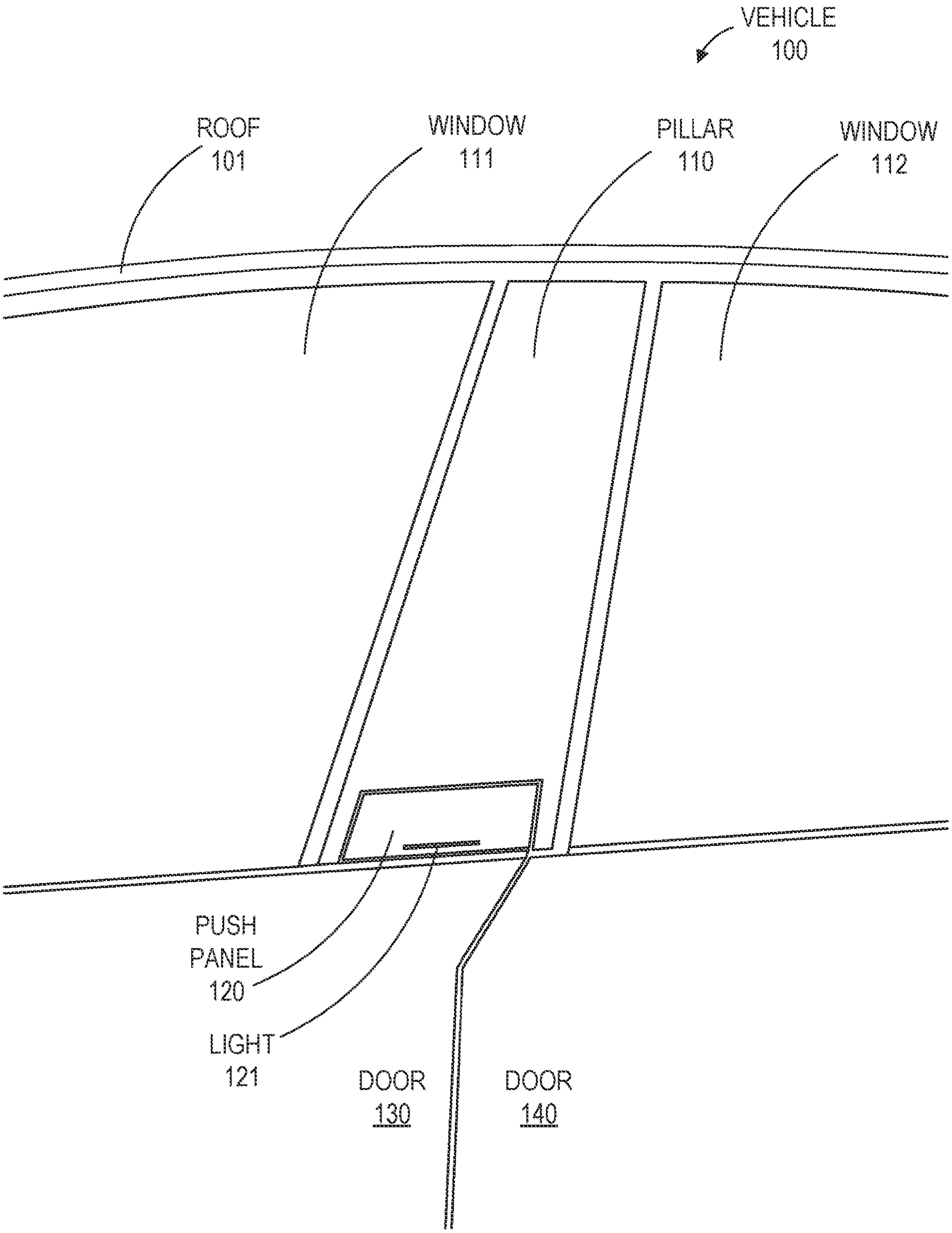
FIG. 1 is a partial side view of a vehicle, showing portions of a door assembly, according to some example embodiments.

According to various example embodiments described herein, a door assembly includes a door, and the door includes a first latch component (e.g., an anchor or a set of jaws) configured to couple with a second latch component (e.g., a set of jaws or an anchor, complementing the first latch component) that is mounted to a jamb in which there is a cavity. The door assembly also includes a push panel (e.g., a hinged flap or other inwardly movable panel) mounted to the jamb, and the push panel covers at least a portion of the cavity in the jamb. The push panel is mounted adjacent to an edge of the door when the door is closed against the jamb, and the push panel is configured to release the first latch component of the door from coupling with the second latch component mounted to the jamb, in response to the push panel being pressed into (e.g., pushed to swing into or otherwise enter into) the cavity in the jamb. The door is configured to be opened by a force (e.g., applied by a human hand) pulling on the edge adjacent to the push panel, after the first latch component of the door has been released from coupling with the second latch component in response to the push panel being pressed into the cavity in the jamb.

According to further example embodiments described herein, a vehicle (e.g., a car, a pickup truck, an airplane, a boat, or any suitable combination thereof) includes one or more instances of the above-described door assembly. That is, a vehicle may include a door that includes a first latch component (e.g., an anchor or a set of jaws) configured to couple with a second latch component (e.g., a set of jaws or an anchor) that is mounted to a jamb having a cavity. The vehicle may include a push panel (e.g., a hinged flap) mounted to the jamb, covering at least a portion of the cavity in the jamb, and adjacent to an edge of the door when the door is closed against the jam. The push panel may be configured to release the first latch component of the door from coupling with the second latch component mounted to the jamb, in response to the push panel being pressed into (e.g., pushed to swing into) the cavity in the jamb. The door may thus be configured to be opened by a force (e.g., applied by a human hand) pulling on the edge adjacent to the push panel, after the first latch component of the door has been released from coupling with the second latch component in response to the push panel being pressed into the cavity in the jamb.

Examples merely typify possible variations. Unless explicitly stated otherwise, structures (e.g., structural components) are optional and may be combined or subdivided, and operations (e.g., in a procedure, algorithm, or other function) may vary in sequence or be combined or subdivided. In the following description, for purposes of explanation, numerous specific details are set forth to provide a thorough understanding of various example embodiments. It will be evident to one skilled in the art, however, that the present subject matter may be practiced without these specific details.

FIG. 1 is a partial side view (e.g., a partial left side view, a partial driver's side view, or both) of a vehicle 100 (e.g., a car, a pickup truck, an airplane, or a boat), showing portions of a door assembly that is incorporated into the vehicle 100, according to some example embodiments. The vehicle is shown as including a door 130 (e.g., a front door) and another door 140 (e.g., a rear door), as well as a roof 101 of the vehicle 100. The door 130 has a corresponding window 111 (e.g., a side window of a front door), and the door 140 has a corresponding window 112 (e.g., a side window of a rear door). The door 130 has a jamb in the example form of a pillar 110 of the vehicle 100. The jamb (e.g., pillar 110) may form all or part of a frame for the door 130 (e.g., a door frame in which the door 130 is configured to swing open or closed). While FIG. 1 depicts the jamb of the door 130 as a B-pillar of a front door of the vehicle 100 (e.g., a car or a truck), the present discussion may apply similarly to a jamb of the door 140, which may be a C-pillar of a rear door of the vehicle 100.

As shown in FIG. 1, the pillar 110 includes a push panel 120 (e.g., a hinged flap mounted to the pillar 110) that fully or partly covers a cavity in the pillar 110. For example, the cavity in the pillar 110 may be partly (e.g., mostly) covered by the push panel 120, while the door 130 covers the remainder of the cavity in the pillar 110. The cavity in the pillar 110 allows the push panel 120 to be pressed inward into the cavity (e.g., in which a switch is actuatable by the push panel 120 to unlatch the door 130). The door 130, the push panel 120, and the pillar 110 (except for the cavity covered by the push panel 120) may be flush with each other (e.g., when the door 130 is latched closed against the jamb) and may all together appear as a smooth surface to a human observing the vehicle 100. The push panel 120 may include a light 121 embedded therein (e.g., flush with the outer surface of the push panel 120). According to various example embodiments, the light 121 may have any one of various shapes (e.g., a thin bar, a circle, or a logo of a manufacturer of the vehicle 100), and the light 121 may be visible or invisible when unlit.

Figure 2:
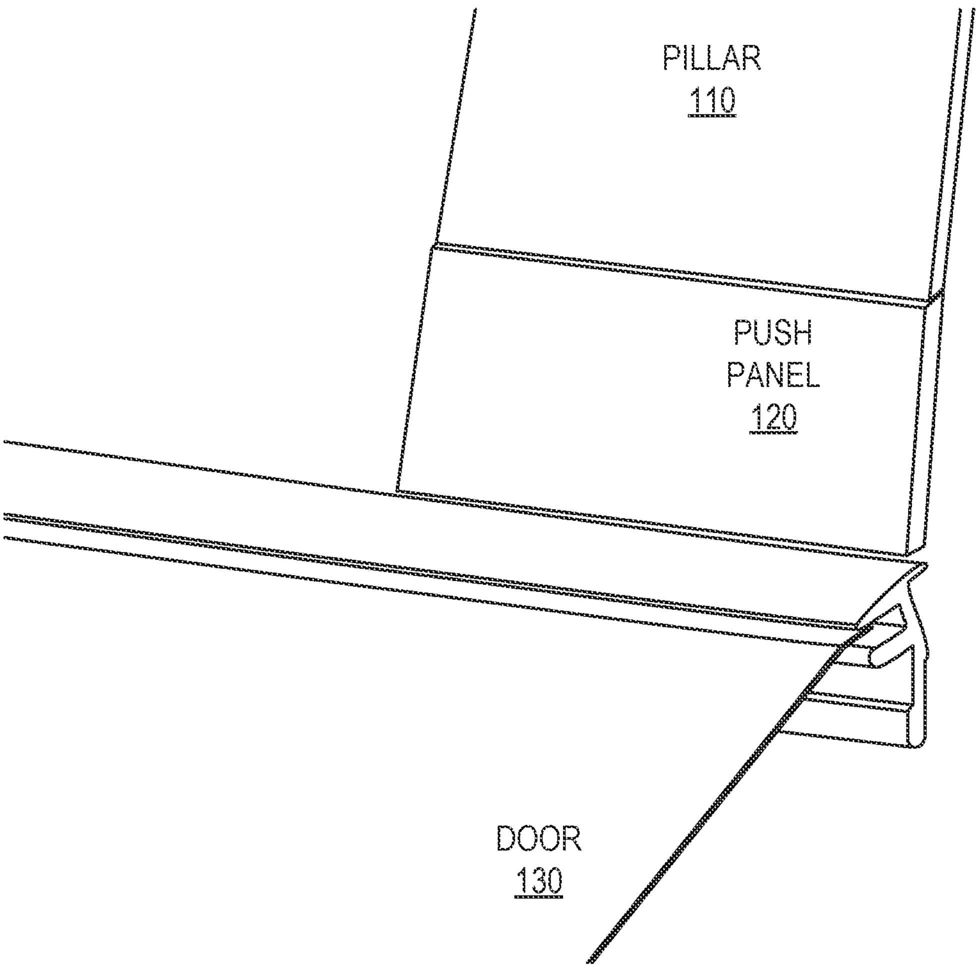
FIG. 2 is a perspective view of a push panel, with portions of its corresponding door and its corresponding jamb (e.g., a pillar of a vehicle), according to some example embodiments.

FIG. 2 is a perspective view of the push panel 120 and showing portions of its corresponding door 130 and its corresponding jamb (e.g., the pillar 110 of the vehicle 100), according to some example embodiments. As noted above, the door 130, the push panel 120, and the pillar 110 (except for the cavity that is being fully or partially covered by the push panel 120) may be flush with each other (e.g., when the door 130 is latched closed against the pillar 110). FIG. 2 shows the door assembly described herein in an initial state, with the door 130 latched closed and the push panel 120 in a closed position as well (e.g., flush with an adjacent edge of the door 130).

Figure 3:
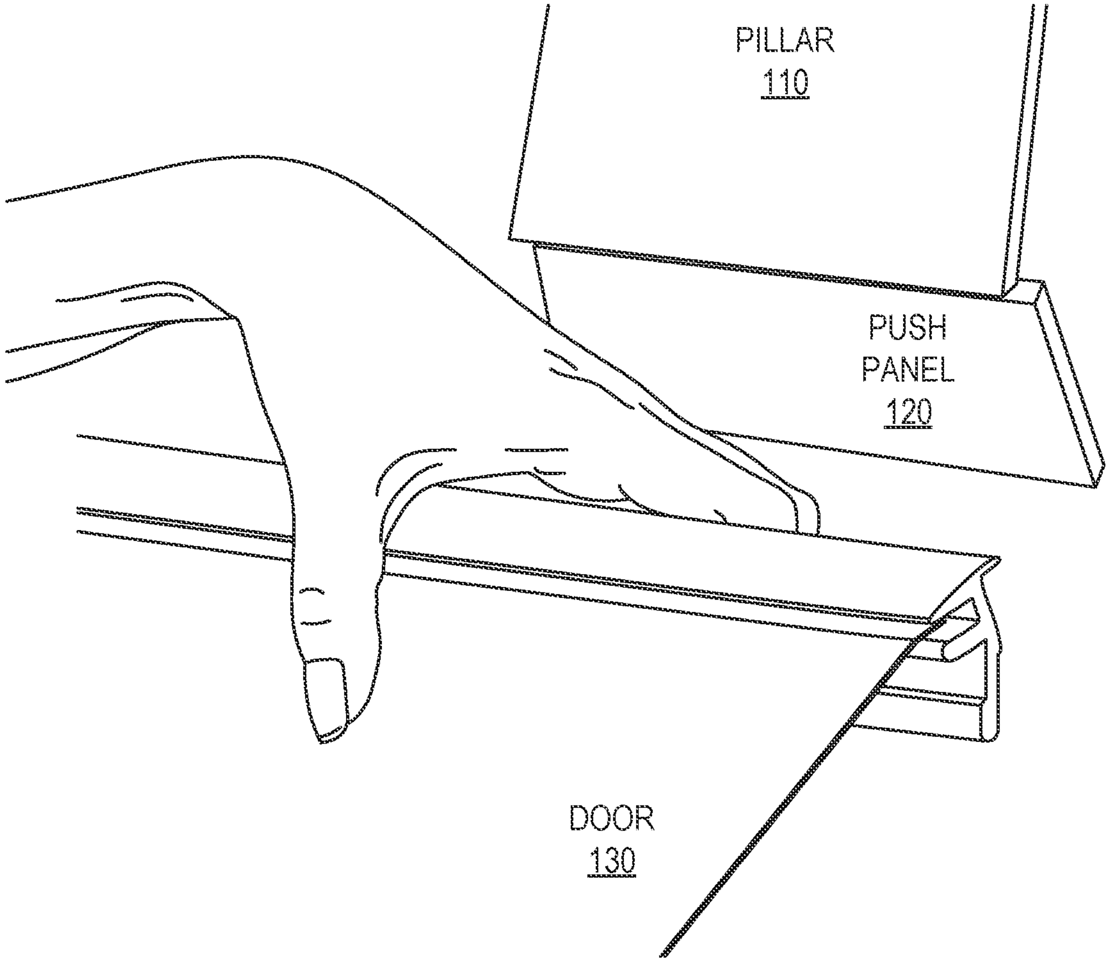
FIG. 3 is a perspective view of the push panel, showing a human hand pushing the push panel into a cavity of the jamb, according to some example embodiments.

FIG. 3 is a perspective view of the push panel 120 and showing a human hand pushing the push panel 120 into the cavity of the jamb, in its example form as the pillar 110 of the vehicle 100 (e.g., to unlatch the door), according to some example embodiments. In operating the door assembly to open the door 130, the human hand pushes on the push panel 120. In some example embodiments, pushing on the push panel 120 causes the push panel 120 to rotate about a hinge, which causes the push panel 120 to enter (e.g., extend) at least partially into the cavity within the jamb (e.g., pillar 110) of the door assembly.

As shown in FIG. 3, the door assembly described herein is in an intermediate operating state, with the door 130 still closed (e.g., with the door 130 having a free swinging edge contacting the jamb) but no longer latched to the jamb (e.g., unlatched), due to the push panel 120 having been pressed (e.g., by the human hand) into the cavity of the jamb (e.g., the cavity in the pillar 110) and thus releasing the latch (e.g., releasing a first latch component in the door 130 from coupling with a second latch component in the pillar 110). The human hand in FIG. 2 has overcome inertial resistance of the push panel 120, as well as any spring resistance (e.g., from a hinge spring) tending to return the push panel 120 to a closed position (e.g., as shown in FIG. 2). In some example embodiments, pushing on the push panel 120 beyond a preconfigured extent activates a switch that unlatches the door 130, and in such example embodiments, the human hand in FIG. 3 has additionally overcome any switch resistance in activating the switch. However, in this intermediate operating state, the human hand in FIG. 3 has not yet begun pulling on the edge of the door 130 and thus has not yet begun to overcome any inertial resistance of the door 130 or any spring resistance tending to keep the door 130 closed.

Figure 4:
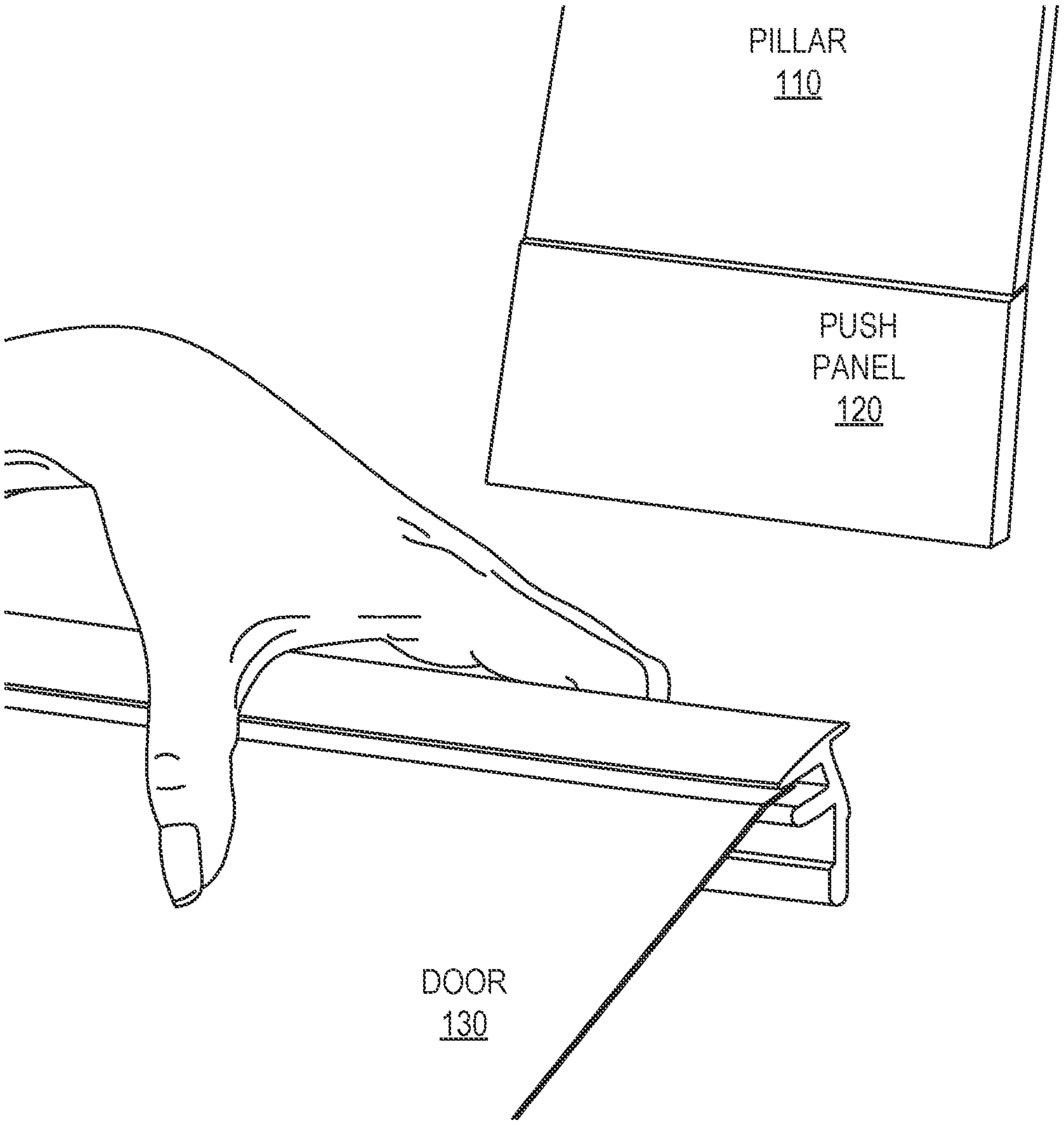
FIG. 4 is a perspective view of the push panel, showing the human hand pulling the door open away from the jamb, according to some example embodiments.

FIG. 4 is a perspective view of the push panel 120, showing the human hand pulling the door 130 open away from the jamb, in its example form as the pillar 110 of the vehicle 100 (e.g., after unlatching the door as shown in FIG. 2), according to some example embodiments. As shown, the door assembly described herein is in a further operating state, with the unlatched door 130 now being swung open by a pulling force imparted by the human hand (e.g., grasping and pulling on an edge of the door 130, where the edge is adjacent to the push panel 120 in its closed position, as shown in FIG. 1). The human hand in FIG. 3 has now overcome inertial resistance of the door 130, as well as any spring resistance tending to return the door 130 to its closed position (e.g., as shown in FIG. 1 and FIG. 2). However, in this further operating state, the human hand in FIG. 3 is no longer overcoming any inertial resistance of the push panel 120 or any spring resistance tending to return the push panel 120 to its closed position (e.g., as shown in FIG. 1 and FIG. 3).

Figure 5:
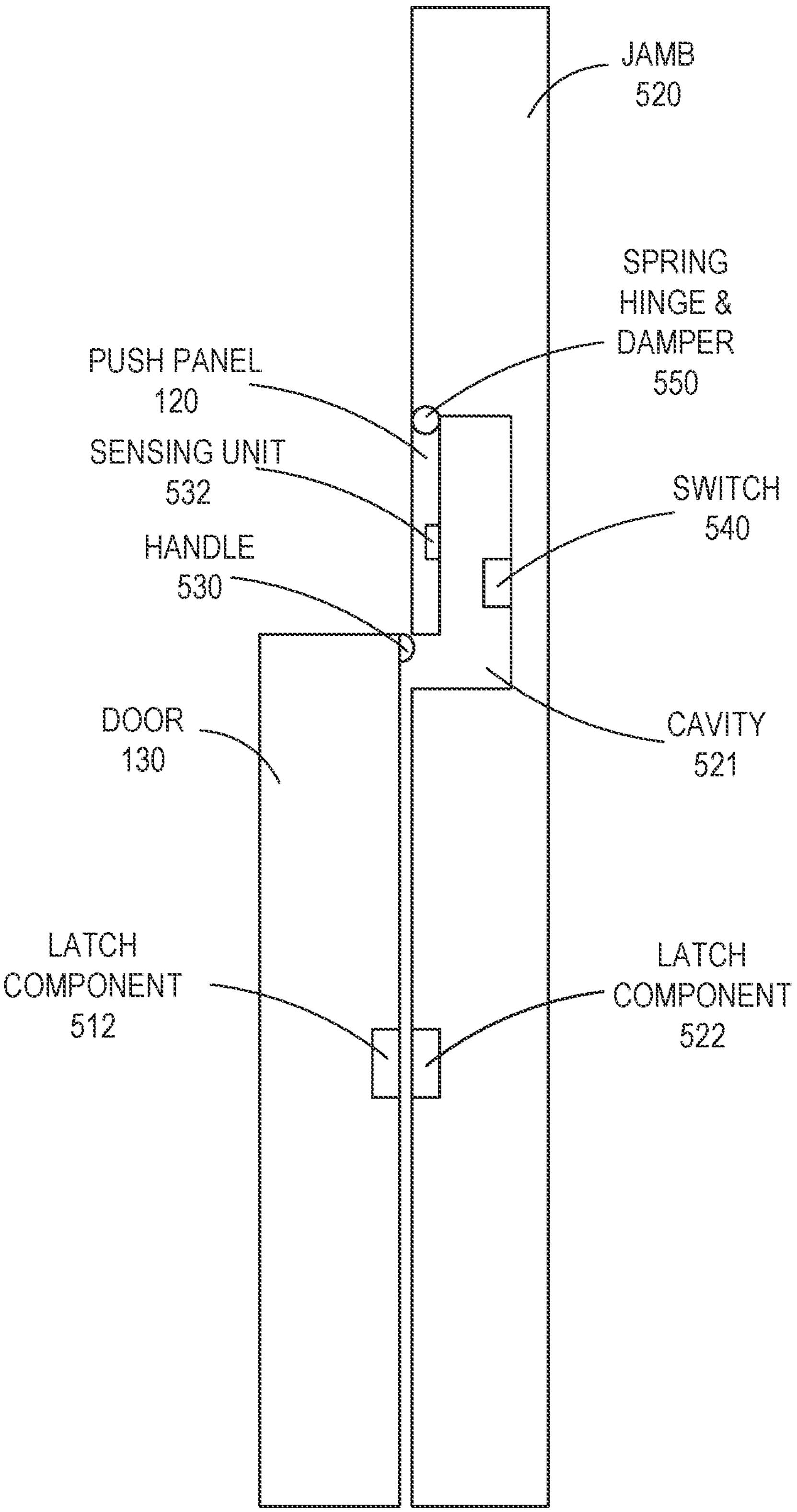
FIG. 5 is a block diagram illustrating a cross-sectional view of the push panel, its corresponding door, and its corresponding jamb, according to some example embodiments.

FIG. 5 is a block diagram illustrating a cross-sectional view of the push panel 120, its corresponding door 130, and its corresponding jamb 520 (e.g., pillar 110), according to some example embodiments. As shown, the jamb 520 fully or partially includes or otherwise defines a cavity 521, and the push panel 120 may fully or partly cover the cavity 521. The push panel 120 is configured to enter (e.g., swing) into the cavity 521 (e.g., in response to being pressed into the cavity 521). A spring hinge and damper 550 mounts or otherwise affixes the push panel 120 to the jamb 520, permits the push panel 120 to enter the cavity 521, provides spring resistance that tends to restore or otherwise bias the push panel 120 towards its closed position, provides damping that slows movement of the push panel 120 toward its closed position (e.g., to avoid trapping or pinching the human hand after the push panel 120 has been pressed into the cavity 521), or any suitable combination of these functions.

Within the cavity 521 is a switch 540 (e.g., an electrical switch, an optical switch, a mechanical switch, a hydraulic switch, or any suitable combination thereof) that is mounted, coupled, or otherwise affixed to the jamb 520 (e.g., pillar 110). The switch 540 is operable (e.g., activatable or actuatable) to unlatch the door 130. For example, the door 130 may include a first latch component 512 that is configured to couple with (e.g., latch to) a second latch component 522 within the jamb 520 (e.g., pillar 110), and the switch 540 may be operable (e.g., by being pressed by the push panel 120) to release the first latch component 512 from coupling with (e.g., latching to) the second latch component 522.

In some example embodiments, the first latch component 512 is or includes a set of jaws, and the second latch component 522 is or includes an anchor, where the set of jaws is movable and configured to releasably grasp or otherwise secure the anchor to latch the door 130 and to release the anchor to unlatch the door 130. In alternative example embodiments, the first latch component 512 is or includes an anchor, and the second latch component 522 is or includes a set of jaws, where the set of jaws is movable and configured to releasably grasp or otherwise secure the anchor to latch the door 130 and to release the anchor to unlatch the door 130.

In some example embodiments, the door 130 has a handle 530 mounted or otherwise affixed to an edge of the door 130 (e.g., along the edge and on an interior surface of the door 130) and adjacent to the push panel 120 when the door 130 and the push panel 120 are in their respective closed positions. The handle 530 of the door 130 may be shaped to provide a measure of safety and comfort to the human hand when the human hand is grasping and pulling on the edge of the door 130. Furthermore, in certain example embodiments, the handle 530 extends along the edge of the door 130 and terminates at its distal end (e.g., furthermost from a hinge of the door 130) with a bumper that is made of cushioning, deformable, or otherwise padding material, configured to reduce interaction between humans (e.g., users of the vehicle 100) and a distal portion of the door 130. Thus, the bumper may beneficially protect humans (e.g., users of the vehicle 100) from getting jabbed by the distal portion of the door 130. For example, the door 130 may terminate in an acute corner adjacent to the push panel 120 in its closed position, and the distal end of the handle 530 may be or include a soft foam bumper that aligns with the acute corner of the door 130.

In certain example embodiments, the push panel 120 includes a sensing unit 532 that detects presence or absence of an operating condition (e.g., the push panel 120 being pressed into the cavity 521). In response detection of this operating condition, the sensing unit 532 communicates with a lock controller (e.g., onboard the push panel 120 or elsewhere within the vehicle 100) and causes the lock controller to lock or unlock the door 130.

Figure 6:
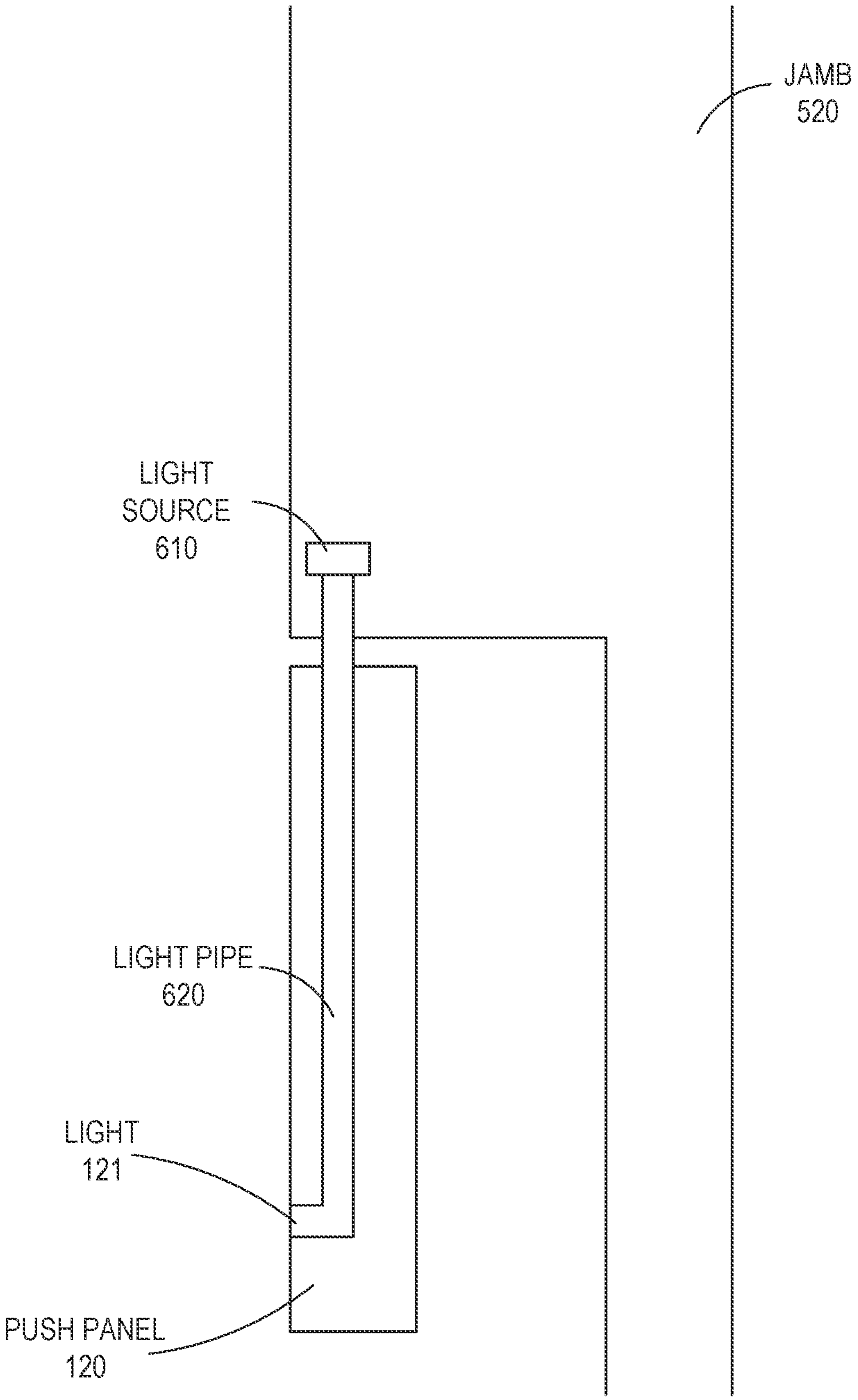
FIG. 6 is a block diagram illustrating an enlarged cross-sectional of view of the push panel, its corresponding jamb, and a lighting feature of the push panel, according to some example embodiment.

FIG. 6 is a block diagram illustrating an enlarged cross-sectional of view of the push panel 120, its corresponding jamb 520 (e.g., pillar 110), and a lighting feature of the push panel (e.g., a lighting feature that includes the light 121), according to some example embodiment. As shown, the jamb 520 (e.g., pillar 110) includes (e.g., contains or otherwise has) a light source 610, such as an LED light source. A light pipe 620 (e.g., an optical conductor, such as fiber optic material) optically couples the light source 610 into the push panel 120 and further to the light 121 (e.g., an aperture or other light emitter), which may be embedded into the push panel 120. The light pipe 620 may terminate at an outer surface that is flush with an outer surface of the push panel 120. The outer surface of the light pipe 620 may include a terminal portion (e.g., light 121) that is transparent, translucent, or opaque, such that the terminal portion is configured to emit light. In operation, the light source 610 generates light, and the light pipe 620 conveys the generated light to the light 121, which emits the light received via (e.g., from) the light pipe 620 (e.g., out into an environment of the vehicle 100).

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and their functionality presented as separate components and functions in example configurations may be implemented as a combined structure or component with combined functions. Similarly, structures and functionality presented as a single component may be implemented as separate components and functions. These and other variations, modifications, additions, and improvements fall within the scope of the subject matter herein.

Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The following enumerated descriptions describe various examples of methods, machine-readable media, and systems (e.g., machines, devices, or other apparatus) discussed herein. Any one or more features of an example, taken in isolation or combination, should be considered as being within the disclosure of this application.

A first example provides an apparatus comprising:

a door that includes a first latch component configured to couple with a second latch component that is mounted to a jamb having a cavity; and a push panel coupled (e.g., mounted) to the jamb, covering at least a portion of the cavity in the jamb, and adjacent to an edge of the door when the door is closed against the jamb, the push panel being configured to release the first latch component of the door from coupling with the second latch component mounted to the jamb in response to the push panel being pressed into the cavity in the jamb;

wherein the door is configured to be opened by a force pulling on the edge adjacent to the push panel after the first latch component of the door has been released from coupling with the second latch component in response to the push panel being pressed into the cavity in the jamb.

A second example provided apparatus according to the first example, wherein:

the door is configured to be unlatched from the jamb by an extending motion of a hand, the extending motion pressing the push panel into the cavity after overcoming actuation resistance of the push panel but overcoming no inertial resistance of the door.

A third example provides an apparatus according to the first example or the second example, wherein:

the door is configured to be opened away from the jamb by a retracting motion of a hand, the retracting motion pulling the edge of the door after overcoming inertial resistance of the door but overcoming no actuation resistance of the push panel.

A fourth example provides an apparatus according to any of the first through third examples, wherein:

the door includes a handle along an interior surface of the edge of the door, the handle being adjacent to the push panel coupled to the jamb when the door is closed against the jamb, the handle being accessible when the push panel is moved into the cavity, the handle being inaccessible (e.g., covered) when the push panel is covering the cavity.

A fifth example provides an apparatus according to any of the first through fourth examples, wherein:

the push panel (e.g., a corner thereof) is aligned with a corner of the door when the door is closed against the jamb; and the door includes a bumper mounted to the corner of the door, the bumper being adjacent to the push panel (e.g., adjacent to the corner thereof) mounted to the jamb when the door is closed against the jamb.

A sixth example provides an apparatus according to any of the first through fifth examples, wherein:

the jamb includes a light source; and the push panel adjacent to edge of the door when the door is closed against the jamb includes a light pipe configured to receive light from the light source and emit the received light from the push panel.

A seventh example provides an apparatus according to any of the first through sixth examples, wherein:

the jamb includes a switch (e.g., electrical, optical, mechanical, hydraulic, or any suitable combination thereof) operable to release the first latch component (e.g., a set of jaws) of the door from coupling with the second latch component (e.g., an anchor) mounted to the jamb; and the push panel is configured to actuate the switch included in the jamb in response to the push panel being pressed into the cavity of the jamb.

An eighth example provides an apparatus according to any of the first through seventh examples, wherein:

the jamb includes a spring coupled (e.g., connected) to the push panel and configured to move the push panel out of the cavity in the jamb after the push panel is pressed into the cavity; and the jamb includes a damper configured to slow the push panel while the push panel is moving out of the cavity.

A ninth example provides a door assembly comprising:

a door that includes a first latch component configured to couple with a second latch component that is mounted to a jamb having a cavity; and a push panel coupled (e.g., mounted) to the jamb, covering at least a portion of the cavity in the jamb, and adjacent to an edge of the door when the door is closed against the jamb, the push panel being configured to release the first latch component of the door from coupling with the second latch component mounted to the jamb in response to the push panel being pressed into the cavity in the jamb;

wherein the door is configured to be opened by a force pulling on the edge adjacent to the push panel after the first latch component of the door has been released from coupling with the second latch component in response to the push panel being pressed into the cavity in the jamb.

A tenth example provides a door assembly according to the ninth example, wherein:

the door is configured to be unlatched from the jamb by an extending motion of a hand, the extending motion pressing the push panel into the cavity after overcoming actuation resistance of the push panel but overcoming no inertial resistance of the door.

An eleventh example provides a door assembly according to the ninth example or the tenth example, wherein:

the door is configured to be opened away from the jamb by a retracting motion of a hand, the retracting motion pulling the edge of the door after overcoming inertial resistance of the door but overcoming no actuation resistance of the push panel.

A twelfth example provides a door assembly according to any of the ninth through eleventh examples, wherein:

the jamb includes a light source; and the push panel adjacent to edge of the door when the door is closed against the jamb includes a light pipe configured to receive light from the light source and emit the received light from the push panel.

A thirteenth example provides a door assembly according to any of the ninth through twelfth examples, wherein:

the jamb includes a switch operable to release the first latch component of the door from coupling with the second latch component mounted to the jamb; and the push panel is configured to actuate the switch included in the jamb in response to the push panel being pressed into the cavity of the jamb.

A fourteenth example provides a door assembly according to any of the ninth through thirteenth examples, wherein:

the jamb includes a spring coupled (e.g., connected) to the push panel and configured to move the push panel out of the cavity in the jamb after the push panel is pressed into the cavity; and the jamb includes a damper configured to slow the push panel while the push panel is moving out of the cavity.

A fifteenth example provides a vehicle (e.g., a car, a pickup truck, an airplane, a boat, or any suitable combination thereof) comprising:

a door that includes a first latch component configured to couple with a second latch component that is mounted to a jamb having a cavity; and a push panel coupled (e.g., mounted) to the jamb, covering at least a portion of the cavity in the jamb, and adjacent to an edge of the door when the door is closed against the jamb, the push panel being configured to release the first latch component of the door from coupling with the second latch component mounted to the jamb in response to the push panel being pressed into the cavity in the jamb;

wherein the door is configured to be opened by a force pulling on the edge adjacent to the push panel after the first latch component of the door has been released from coupling with the second latch component in response to the push panel being pressed into the cavity in the jamb.

A sixteenth example provides a vehicle according to the fifteenth example, wherein:

the door is configured to be unlatched from the jamb by an extending motion of a hand, the extending motion pressing the push panel into the cavity after overcoming actuation resistance of the push panel but overcoming no inertial resistance of the door.

A seventeenth example provides a vehicle according to the fifteenth example or the sixteenth example, wherein:

the door is configured to be opened away from the jamb by a retracting motion of a hand, the retracting motion pulling the edge of the door after overcoming inertial resistance of the door but overcoming no actuation resistance of the push panel.

An eighteenth example provides a vehicle according to any of the fifteenth through seventeenth examples, wherein:

the jamb includes a light source; and the push panel adjacent to edge of the door when the door is closed against the jamb includes a light pipe configured to receive light from the light source and emit the received light from the push panel.

A nineteenth example provides a vehicle according to any of the fifteenth through eighteenth examples, wherein:

the jamb includes a switch operable to release the first latch component of the door from coupling with the second latch component mounted to the jamb; and the push panel is configured to actuate the switch included in the jamb in response to the push panel being pressed into the cavity of the jamb.

A twentieth example provides a vehicle according to any of the fifteenth through nineteenth examples, wherein:

the jamb includes a spring coupled (e.g., connected) to the push panel and configured to move the push panel out of the cavity in the jamb after the push panel is pressed into the cavity; and the jamb includes a damper configured to slow the push panel while the push panel is moving out of the cavity.

What is claimed is:

1. Apparatus comprising:

a door that includes a first latch component configured to couple with a second latch component that is mounted to a jamb having a cavity with an interior surface, wherein the door is configured to be mounted to pivot relative to the jamb;

a switch provided within the cavity of the jamb and mounted to the interior surface of the cavity of the jamb, wherein the switch is operable to release the first latch component included in the door with the second latch component mounted to the jamb; and a push panel coupled to the jamb about a pivotable axis, covering at least a portion of the cavity in the jamb, and adjacent to an upper edge of the door when the door is closed against the jamb, the push panel being configured to press the switch within the cavity of the jamb when pivoted about the axis and pressed into the cavity of the jamb to release the first latch component of the door from coupling with the second latch component mounted to the jamb;

wherein the door is configured to be opened away from the jamb by a force pulling on the upper edge adjacent to the push panel after the first latch component of the door has been released from coupling with the second latch component in response to the push panel being pressed into the cavity in the jamb and to press the switch within the cavity.

2. The apparatus of claim 1, wherein:

the door is configured to be unlatched from the jamb by an extending motion of a hand, the extending motion pressing the push panel into the cavity of the jamb after overcoming actuation resistance of the push panel but overcoming no inertial resistance of the door.

3. The apparatus of claim 1, wherein:

the door is configured to be opened away from the jamb by a retracting motion of a hand, the retracting motion pulling the upper edge of the door after overcoming inertial resistance of the door but overcoming no actuation resistance of the push panel.

4. The apparatus of claim 1, wherein:

the door includes a handle along an interior surface of the upper edge of the door, the handle being adjacent to the push panel coupled to the jamb when the door is closed against the jamb.

5. The apparatus of claim 4, wherein the door terminates in an acute corner adjacent to the push panel in its closed position, and a distal end of the handle aligns with the acute corner of the door.

6. The apparatus of claim 1, wherein:

the jamb includes a light source; and the push panel includes a light pipe configured to receive light from the light source and emit the received light from the push panel.

7. The apparatus of claim 1, wherein:

the jamb includes a spring configured to move the push panel out of the cavity in the jamb after the push panel is pressed into the cavity; and the jamb includes a damper configured to slow the push panel while the push panel is moving out of the cavity.

8. The apparatus of claim 1, wherein the push panel is coupled to the jamb about the pivotable axis located at a top of the cavity, and is adjacent to the upper edge of the door when the door is closed against the jamb.

9. The apparatus of claim 8, wherein the entirety of the push panel is pressed into the cavity of the jamb by rotating the push panel about the axis located at the top of the cavity.

10. The apparatus of claim 8, wherein the push panel is pressed into the cavity in the jamb, pressing the switch mounted to the jamb, by pivoting about the pivotable axis located at the top of the cavity in the jamb.

11. The apparatus of claim 10, wherein the switch is mounted to the interior surface of the cavity of the jamb adjacent the upper edge of the door.

12. The apparatus of claim 1, wherein the first latch component and the second latch component are located away from the cavity.

13. The apparatus of claim 1, wherein the push panel comprises a sensing unit configured to detect when the push panel is pressed into the cavity of the jamb, wherein the sensing unit is configured to communicate with a lock controller to lock or unlock the door.

14. A door assembly comprising:

a door that includes a first latch component configured to couple with a second latch component that is mounted to a jamb having a cavity with an interior surface, wherein the door is configured to be mounted to pivot relative to the jamb;

a switch provided within the cavity of the jamb and mounted to the interior surface of the cavity of the jamb, wherein the switch is operable to release the first latch component included in the door with the second latch component mounted to the jamb; and a push panel coupled to the jamb about a pivotable axis, covering at least a portion of the cavity in the jamb, and adjacent to an upper edge of the door when the door is closed against the jamb, the push panel being configured to press the switch within the cavity of the jamb when pivoted about the axis and pressed into the cavity of the jamb to release the first latch component of the door from coupling with the second latch component mounted to the jamb;

wherein the door is configured to be opened away from the jamb by a force pulling on the upper edge adjacent to the push panel after the first latch component of the door has been released from coupling with the second latch component in response to the push panel being pressed into the cavity in the jamb and to press the switch within the cavity.

15. The door assembly of claim 14, wherein:

the door is configured to be unlatched from the jamb by an extending motion of a hand, the extending motion pressing the push panel into the cavity of the jamb after overcoming actuation resistance of the push panel but overcoming no inertial resistance of the door.

16. The door assembly of claim 14, wherein:

the door is configured to be opened away from the jamb by a retracting motion of a hand, the retracting motion pulling the upper edge of the door after overcoming inertial resistance of the door but overcoming no actuation resistance of the push panel.

17. The door assembly of claim 14, wherein:

the jamb includes a light source; and the push panel includes a light pipe configured to receive light from the light source and emit the received light from the push panel.

18. The door assembly of claim 14, wherein:

the jamb includes a spring configured to move the push panel out of the cavity in the jamb after the push panel is pressed into the cavity; and the jamb includes a damper configured to slow the push panel while the push panel is moving out of the cavity.

19. A vehicle comprising:

a vehicle door that includes a first latch component configured to couple with a second latch component that is mounted to a jamb having a cavity with an interior surface, wherein the vehicle door is configured to be mounted to pivot relative to the jamb;

a switch provided within the cavity of the jamb and mounted to the interior surface of the cavity of the jamb, wherein the switch is operable to release the first latch component included in the door with the second latch component mounted to the jamb; and a push panel coupled to the jamb about a pivotable axis, covering at least a portion of the cavity in the jamb, and adjacent to an upper edge of the vehicle door when the vehicle door is closed against the jamb, the push panel being configured to press the switch within the cavity of the jamb when pivoted about the axis and pressed into the cavity of the jamb to release the first latch component of the vehicle door from coupling with the second latch component mounted to the jamb;

wherein the vehicle door is configured to be opened away from the jamb by a force pulling on the upper edge adjacent to the push panel after the first latch component of the vehicle door has been released from coupling with the second latch component in response to the push panel being pressed into the cavity in the jamb and to press the switch within the cavity.

20. The vehicle of claim 19, wherein:

the vehicle door is configured to be unlatched from the jamb by an extending motion of a hand, the extending motion pressing the push panel into the cavity of the jamb after overcoming actuation resistance of the push panel but overcoming no inertial resistance of the vehicle door.

* * * * *